June 8, 1965   A. SCHURE ETAL   3,187,443
TEACHING AND TESTING SYSTEM FOR REINFORCED PROGRAMMED LEARNING
Filed May 10, 1963   4 Sheets-Sheet 1

ALEXANDER SCHURE
SHELDON LITTWIN
INVENTORS.

BY
ATTORNEYS

June 8, 1965 A. SCHURE ETAL 3,187,443
TEACHING AND TESTING SYSTEM FOR REINFORCED PROGRAMMED LEARNING
Filed May 10, 1963 4 Sheets-Sheet 2
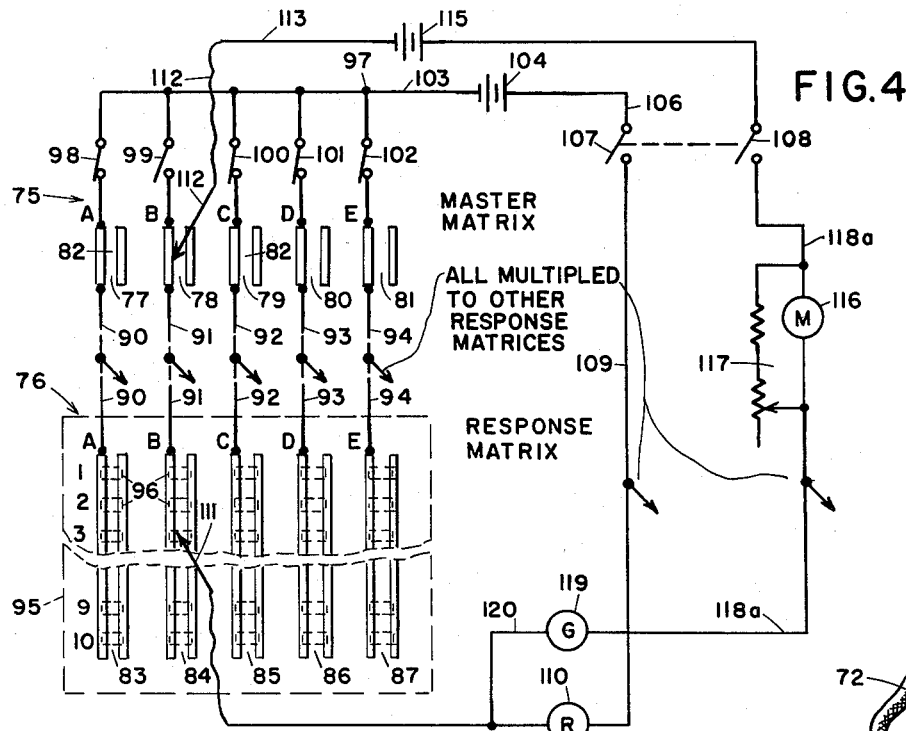
FIG.4
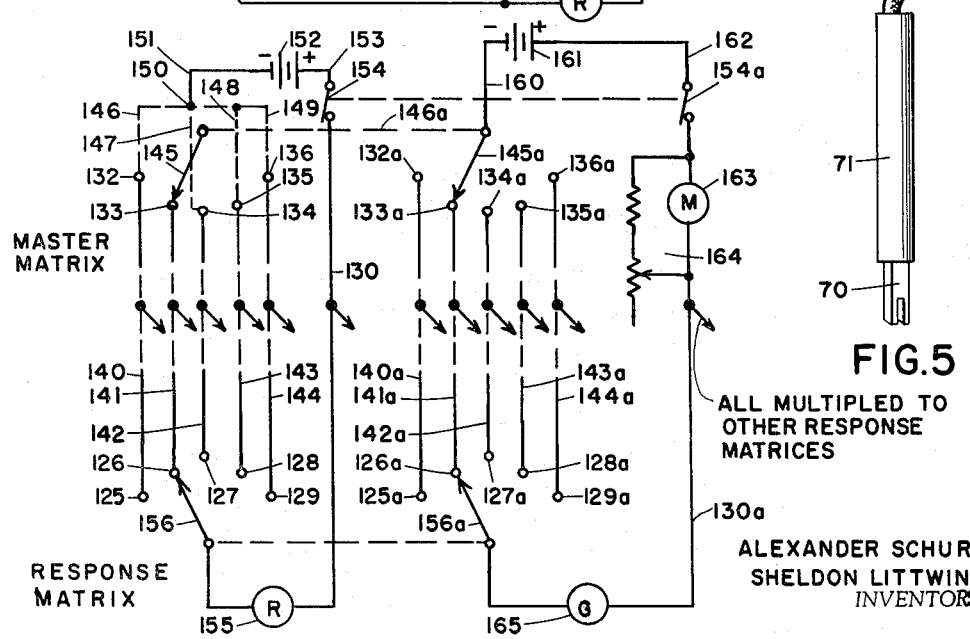
FIG.5
FIG.6
ALEXANDER SCHURE
SHELDON LITTWIN
INVENTORS.
BY *Hoggard & Calimafde*
ATTORNEYS

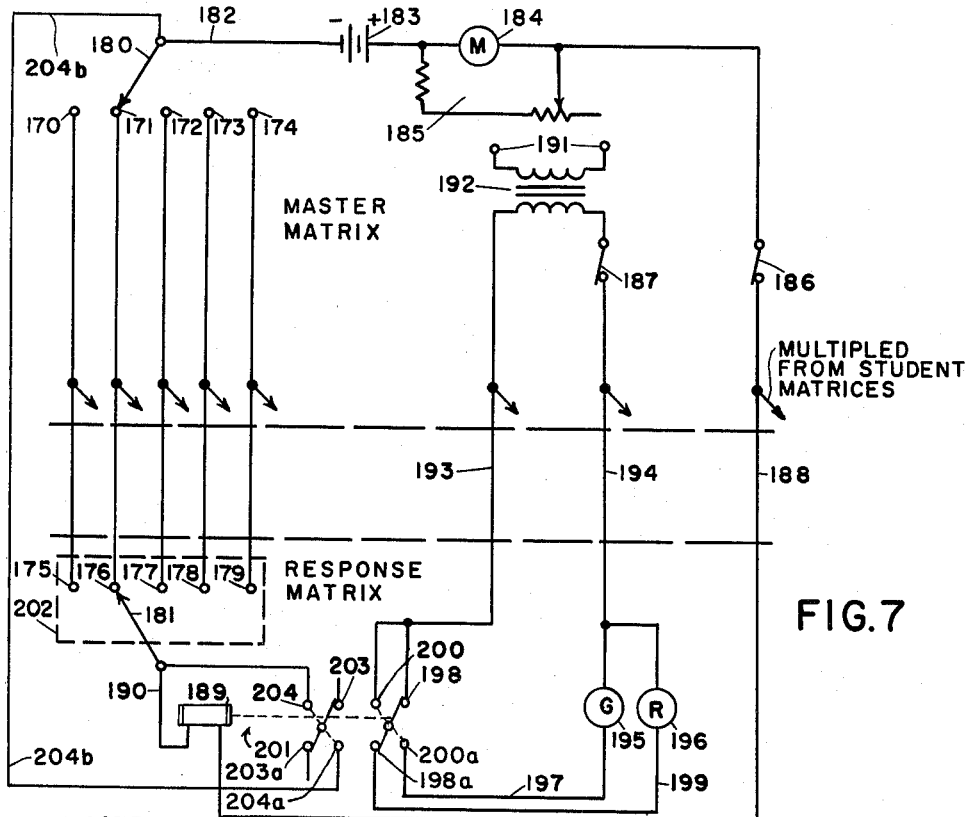
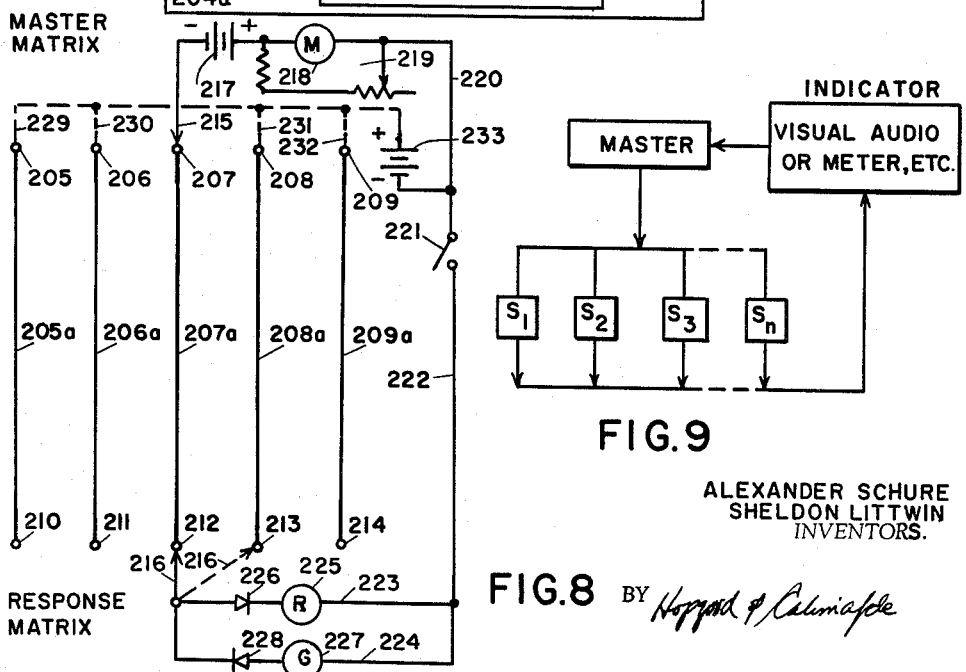

# 3,187,443
TEACHING AND TESTING SYSTEM FOR REINFORCED PROGRAMMED LEARNING
Alexander Schure, 274 Beach 141st St., Belle Harbor, N.Y., and Sheldon Littwin, 3821 Garvey Place, Fair Lawn, N.J.
Filed May 10, 1963, Ser. No. 279,534
7 Claims. (Cl. 35—9)

This invention relates to a teaching and testing system for indicating the results of papers in a lesson or a test and, in particular, to a correlated test scoring and data gathering device for use with programmed learning.

Considerable attention has been given in recent years towards advancing learning or teaching techniques through programmed learning. One effective system of programmed learning is described in U.S. Patent No. 3,046,675, granted July 31, 1962. Correlated testing has been found to be an important adjunct of programmed learning and, as a result, low cost related systems have been continually sought. The primary advantages desired in such systems are:

(a) Immediate reinforcement for the student as each question is answered;
(b) Self scoring performed automatically by the student;
(c) Inexpensive machines or devices, or, low cost capital investment equipment at test costs of only a few pennies per test.

Concurrently, another science has developed relating to the gathering, manipulation and retrieval of information through data processing machines such as computers, tabulators, and similar devices. Normally, the inputs to such computer and/or data systems are made by punched cards, or by magnetic tapes carrying equivalent information. Once suitable data input information is available, various kinds of data processing equipment ranging from simple processing equipment to sophisticated computers may be used to exact desired information.

Test scoring devices which would enable the collection and translation of data with great rapidity, independent of teacher and clerical labor, would be of great value in educational teaching systems, particularly in situations where it is desired to collect the performance records of groups of students on printed out format through the use of adjunct computer equipment, including such other information as correlations to other groups, performance levels, standards and other relevant statistics. The advantages of such a system to boards of education, school superintendents and educators will be readily apparent.

It is an object of the invention to provide a system for use in conjunction with programmed learning whereby a student is provided with immediate reinforcement as to his progress.

Another object is to provide a teaching system in which a device is used to provide immediate psychological reinforcement during the instructional and learning period.

A further object is to provide a correlated testing and data gathering device for use with programmed learning.

Still another object is to provide an automatic test scoring and keying or coding device capable of being controlled by a teacher during class instruction or during programmed learning whereby the capacity of one or more students to understand the subject matter being presented over a controlled time period can be determined concurrently with the presentment of the subject matter.

As another object, the invention provides a test scoring device comprising a master matrix controllable by the teacher via manipulated elements, such as keys, switches, dials or probes in timed relationship to the actuation of another matrix controlled by a student, whereby the time rate at which the student responds is controlled by the teacher.

As an additional object, the invention provides a teaching system in which individual codings may be employed for individual students so that their respective progress can be independently determined.

These and other objects will more clearly appear when taken in conjunction with the disclosure and the accompanying drawings wherein:

FIG. 4 shows somewhat diagrammatically another embodiment of the test scoring device provided by the invention for achieving immediate reinforcement learning;

FIG. 5 is illustrative of another probe means capable of being used in conjunction with a matrix;

FIGS. 6 to 8 are illustrative of several circuit embodiments which may be employed in carrying out the invention;

FIG. 9 is a block diagram showing the use of the invention in class instruction; and FIG. 10 depicts a response indicator circuit which may be used in conjunction with the master and response matrices for indicating when the master and response circuits are on.

Figure 1:
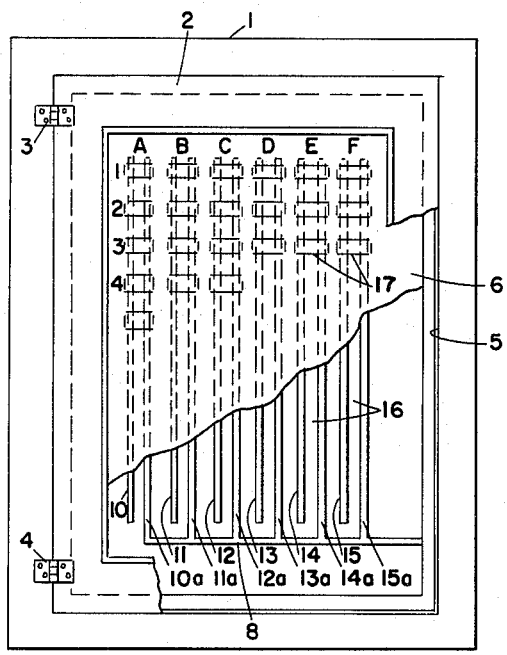
FIG. 1 is one embodiment of a matrix which may be employed in carrying out the invention.

This invention is concerned with a device which is arranged to provide in coded or uncoded form the benefits of immediate psychological reinforcement during the instructional and learning processes. It permits, at relatively low cost, the carrying out of individualized or group teaching methods requiring extensive testing of the student. It provides immediate reinforcement to the individual student as to his progress. In one embodiment, as the student is being tested, he may prepare a punched data card as a permanent record which may be subsequently processed to yield extensive correlated data and reports for use by both the student and the instructional staff charged with responsibility for the learning process.

The device permits the teacher to control the rate at which a test is given whereby to obtain specific information relative to the success of a lecture, or an instructional television program, or an instructional motion picture film. It enables the use of individual codes or keys for each student so that individual tests may be used with programmed learning materials in independent study programs. It can be used to control rate of administration of tests or allow individual rates of progress with individual tests or problems. It may serve as a simulator of complex problems, such as teaching Fortran (that is formula translation) or a related computer language. It can be used with advanced-level mathematical students to verify mathematical techniques used in complex problem solutions. With the use of diagrammatic overlays, it may be used to teach technical skills such as electronic maintenance.

The invention is particularly adapted for setting up of a classroom in which positions are interwired with the seating positions of students connected to a central instructor-controlled position, whereby information can be telemetered from each student to the instructor. Thus, as the student proceeds with either a self-test or an examination of record utilizing a punched card on which his response is permanently indicated by means of a probe, both the instructor and student are aware of the results of the test. This scoring is supplementary to the various records and computations that may be obtained in print-out permanent form from the computers or tabulating equipment which subsequently analyze the punched card. The teacher may control the answer keys for a particular test by setting dials, probes or the like in a control matrix or by using a matrix with answers pre-arranged to be determined by the student by means of his response matrix.

As has been stated above, the rate of student answers to questions during a particular examination may be controlled by the teacher, or by a pre-set time interval controlled by a clock mechanism. Since the device enables the teacher to observe the difficulties that arise during a particular part of an examination, he may interrupt the testing to clarify the concepts being taught or tested. The device may be used without interconnected seat and room wiring, if so desired, by utilizing electrically conductive ink printed code cards in a self-contained circuit module to allow for independent student progress.

If it is intended that the teacher or supervisor of the instructional group be given an indication of relative percentages of correct answers within a student group, indicator lights may be employed in the circuitry and positioned so as to be readily observable from the teaching station. By controlling the rate of testing, the teacher may observe the pattern of colored lights and obtain a relative measure of class comprehension. A disproportionate number of red lights would indicate difficulty in the understanding of the subject matter by the class and the teacher may interrupt the test and give such explanations as may be necessary for clarification before continuing with the test.

In a preferred embodiment, a built-in matrix is employed adapted to receive a punched card. As a student perforates a particular area of that card, contact is made with a response unit or post in the matrix, thus actuating any signal means, such as lights or relays, or telemetering equipment, etc., that may be in the circuit.

In its broad aspects, the invention provides a teaching and testing device comprising a circuit for indicating a desired response to a stimulant, master means for preparing said circuit to indicate said desired response, and means coupled to said circuit and controllable by a student to indicate his response to said stimulant, said stimulant responsive means energizing said circuit only when said student indicates said desired response.

In its more preferred aspect, the device comprises a response matrix means having a network of response units formed of rows of electrically conductive elements and a punch card data gathering element having a plurality of prearranged perforatable spaced areas indexable with the response units of the matrix. A circuit means including a master matrix is provided coupled to the response matrix for preparing the circuit to indicate the desired response when the response matrix is electrically actuated by the student. An electrically conductive probe is employed in conjunction with the punch card and the response matrix for the two-fold purpose of perforating a selected area of the punch card and for activating the response matrix indexed with the punch card. An indicating or signal means electrically coupled to the response matrix via the activated response unit immediately indicates the result of said response, while the same result is stored in the card for future retrievance.

One type of response matrix which may be employed in carrying out the invention is depicted in FIG. 1 which shows in plan view a flat rectangularly shaped matrix carrier 1 having a frame 2 hinged at 3 and 4, which frame fits snugly into annular recess 5 at the opening of the carrier. A standard punch card data storing element 6 is shown partially broken away with an array of perforatable spaced areas in numbered horizontal rows and vertical columns designated by the numbers 1, 2, 3, 4, etc., and letters A, B, C, etc., respectively.

Beneath the data card are shown matrix elements comprising longitudinally disposed channel busses of electrically conductive material, e.g. copper or other suitable material arranged in the form of split pairs of conductors 10, 10a to 15, 15a, respectively. Longitudinal openings 16, also referred to as response channels, are provided for receiving an electrically conductive probe element. Split channel busses 10a to 15a are electrically connected by conductor 8 while each of split channel portions 10 to 15 are connected via switch means to a common junction of a circuit to be described later in connection with FIG. 2.

The perforatable areas designated by the numeral 17 in the card are horizontally and vertically arranged in indexing relationship with the channel busses making up the matrix.

Figure 2:
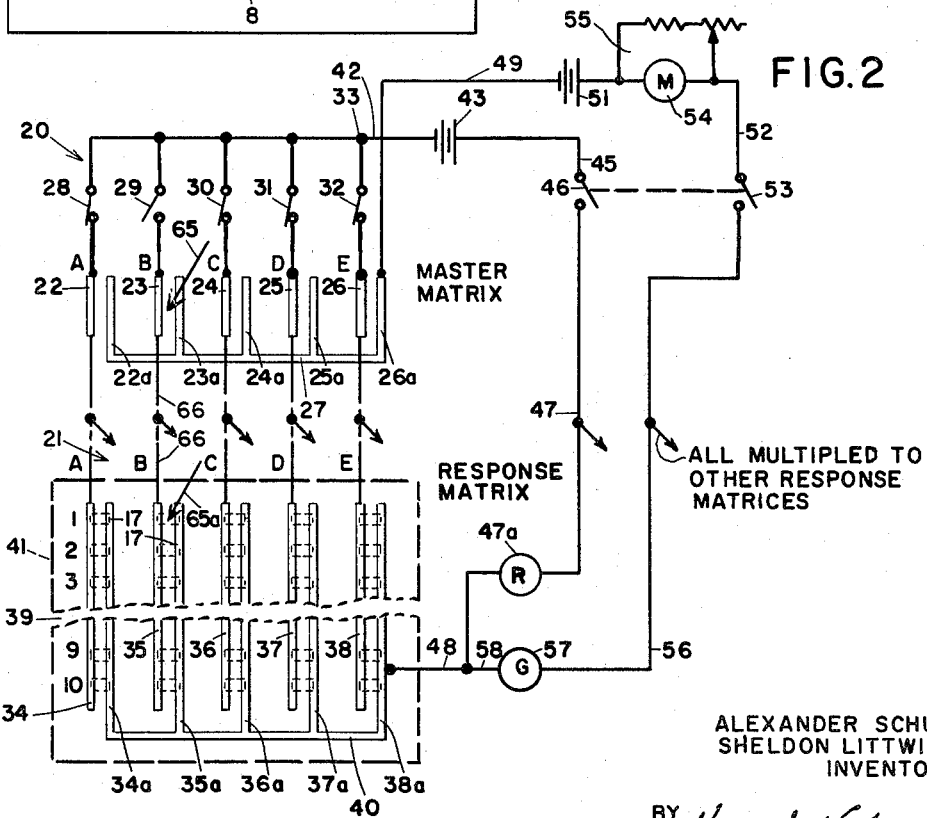
FIG. 2 shows somewhat diagrammatically one embodiment of the test scoring system provided by the invention.

The operation of the matrix will be apparent by referring to FIG. 2 which shows somewhat diagrammatically the arrangement of the matrix relative to the circuitry coupled to it. In effect, two matrices are shown, a master matrix designated generally by the numeral 20 operable, for example, by a teacher, and a response matrix designated generally by 21, operable, for example, by a student.

Referring first to the master matrix, split channel busses 22 and 22a, 23 and 23a, 24 and 24a, 25 and 25a, 26 and 26a are provided wherein the "a" channel portions are connected together via conductor 27, while channel portions 22 to 26 are each connected via normally closed switches 28 to 32, to a circuit at 33.

With regard to response matrix 21, the channel busses comprise 34 and 34a, 35 and 35a, 36 and 36a, 37 and 37a, and 38 and 38a. The matrix may be of any desired length depending upon the length of a test to be conducted, and is broken away at 39 to indicate that the length need not be limited, except within practical limits. Generally speaking, the matrix will be limited in size to the data retrieval card used in conjunction therewith. As in the master matrix, the "a" channel portions 34a to 38a are connected by a conductor 40 while each of channel portions 34 to 38 are electrically connected to corresponding channel portions 22 to 26 of the master matrix as shown remotely situated from the response matrix.

A punch data gathering card 41 is indicated phantomly in dotted line in indexing relationship with matrix 21. The circuitry coupled to the matrices comprises line 42 which is connected to the master matrix at junction 33, a battery or other source of power 43, line 45, switch 46, line 47, red lamp 47a and line 48 connected to conductor 40 of the response matrix.

Another battery operated circuit is employed comprising line 49, battery 51, a test measuring meter 54 with associated control circuit 55, line 52, switch 53 operably coupled to switch 46, green lamp 57 in line 56, and line 58 which is connected to branch line 48. The red and green lamps are means for indicating to the student his response to a particular informational stimulant as will be presently described. It will be apparent from this system that a minimum of wiring is required for carrying out its functions. The meter 54 is a summing meter which permits the instructor to observe the percentage of correct responses made by the group. Multiple circuit connections are provided as shown by arrows in FIG. 2 between the master and response matrices and in lines 47 and 56 for other response matrices depending on the size of the class room.

Figure 3:
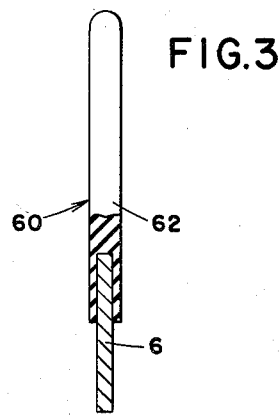
FIG. 3 is illustrative of a probe means which may be used in conjunction with a matrix embodied by the invention.

A probe for use with the embodiment of FIG. 2 is shown in FIG. 3 designated generally by the numeral 60 and comprising an electrically conductive end portion 61 and a handle 62. Alternatively, the probe may simply be a pencil or other implement having a conductive end.

Referring to FIG. 2, let it be assumed, for the sake of illustration, that the comprehension by students of a particular subject is being tested by a teacher. The teacher, for example, hands out to each student a list of ten questions for each of which five possible answers are given (A, B, C, D or E), of which only one is correct.

The teacher has before him his master matrix which is electrically wired and multipled to each of the students' matrices similarly as shown for one student in FIG. 2. The teacher allows a given time for each question. Assuming the correct answer for question No. 1 is "B," the teacher prepares or enables the circuit for the student's response by opening normally closed switch 29, closing circuit switches 46 and 53, and placing his electrically conductive probe into "B" as suggested by arrow 65, thus setting up the correct informational stimulant in the circuit. The student within the given time allotted, must place his probe in one of the channel busses correlated to question No. 1. Assuming he places his probe into No. 1-B shown by the arrow 65a, the green lamp will light indicating he made a correct answer. This will be apparent by tracing the completed circuit starting with line 49 as the master matrix to channel bus 26a along conductor 27 to 23a, via the probe to channel bus 23, line 66 to channel bus 35, then via the probe to channel bus 35a, along conductor 40 to lines 48 and 58, through student green lamp 57 to line 56, across closed switch 53, through summing meter 54, to batteries 51 and back to line 49. The correct answer is summed on meter 54 along with other student answers received via multiple circuit connection indicated in FIG. 2. The red lamp does not light because of open switch 29 at the master matrix. Had the student placed his probe into "A," "C," "D" or "E" of row No. 1, the red lamp would have lighted indicating an incorrect response. The student thus obtains an immediate reinforcement of his answer and at the same time makes a permanent record of it on the data storage card 41 for future tabulation purposes.

If desired, the teacher may have a bank of red and green lights near his desk, one pair in the bank for each student, by noticing the ratio of greens to reds, he can determine to what extent the students as a group comprehend the subject matter. If the red lights predominate, he may decide that further instruction or study is required before proceeding any further with the reinforcement test. After each question, the matrices are cleared of their probes and switches 46 and 53 opened.

In answering question 2, the student places his probe in one of the vertical columns of horizontal row 2 on the card. Assuming the instructor places his probe in "C," while opening switch 30 and closing circuit switches 46 and 53, and the student places his, for example, in No. 2-D, the red lights would go on indicating an incorrect answer. In the meantime, the student is making a permanent record on the card which he is perforating. Upon completion of the test, all of the cards are collected by the instructor and processed through conventional machine processing equipment. This method of analysis enables the obtaining of a printed format containing the following type of information:

(1) A list of the scores received by each student.
(2) A frequency distribution of these scores by section and/or all sections of students taking the examination.
(3) The mean score and standard deviation received by each section and/or all sections.
(4) A combined analysis of the examination itself including the number of students who elected each choice on each question. The correct answer is also indicated and the number of students making the correct choice is listed.

In utilizing this system of analysis, the examination cards are prepared in advance by pre-punching in code the student number, his name, card number, course number, section number, etc.

Meter 54 shown in the circuit of FIG. 2 is conventional and may be a simple ammeter or galvanometer. Its function is simply to sum up the current generated by the circuits indicating the correct answers.

Each student may also have an integrating meter associated with his matrix to total the correct answers during the examination. Integrating meters are well known, and for simplicity have not been illustrated in the drawing. The meter is discharged simply by the student depressing a discharge button which would close a path to ground.

In FIG. 4, another embodiment is shown in which the probe device used is itself connected into the circuit. Such a probe is shown in FIG. 5 comprising an electrically conductive end or probe portion 70, an insulated handle 71 and an insulated conductor 72 which passes through the handle and connects to end portion 70.

Similar split channel busses are shown as in FIG. 2. The master matrix is designated generally by the numeral 75 and the response matrix by the numeral 76.

Referring first to the master matrix, channel busses 77 to 81 are provided with longitudinal openings 82 adapted to receive a probe, said channel busses also corresponding to vertical rows A, B, C, D and E. With regard to the student response matrix 76, channel busses 83 to 87 are provided with one of each of the busses electrically connected to the corresponding buss of the master matrix via lines 90 to 94.

As in FIG. 2, a data storage card 95 is shown phantomly in dotted line in indexing relationship with the matrix. As stated with regard to FIG. 2, the response matrix may be of any general size and usually is limited in size to the data storage or retrieval card.

An element of each of the busses of the master matrix is connected to a common junction 97 via normally closed switches 98 to 102 of a circuit comprising line 103, batteries or other source of power 104, line 106, circuit switch 107 simultaneously operable with switch 108, line 109, student's red lamp 110 and thence to electrically connected probe 111.

The circuit with the green lamp comprises at the master matrix electrically connected probe 112, line 113, batteries or other source of power 115, switch 108, line 118a, test measuring meter 116 with associated control circuit 117, student's green lamp 119 and line 120 connected to probe 111. The meter is used for summing the student's answers with those of other students received via a multiple circuit connection shown in line 118a. Other multiple circuit connections are shown in lines 90 to 94 and 109.

Assuming question No. 3 is to be answered and the instructor has placed his probe into bus 78 at vertical row B, has opened matrix has opened matrix switch 99 and closed circuit switches 107 and 108, the student must, in order to come up with the correct answer, place his probe in corresponding column B of the third horizontal row (question No. 3). The circuit will be energized through the green lamp but not through the red lamp because of open switch 99 at the master matrix and the correct answers summed on meter 116 through branch line 118a.

It will be apparent that the embodiment of FIG. 4 functions similarly to that of FIG. 2 except that the probes are electrically connected via wiring and jacks to the circuit and make direct electrical contact with the channel busses. It will be noted that in either case the student obtains immediate reinforcement of his answer while at the same time produces a permanent record on the punch card storage element.

Referring to FIG. 6, a circuit is shown corresponding diagrammatically to the embodiments illustrated in FIGS. 2 and 4. As will be noted, the master matrix is represented by positions 132 to 136 which correlate to positions 132a to 136a, respectively, which correspond in the case of FIG. 2 to split channels 22 and 22a, etc. Likewise, the response matrix is represented by positions 125 to 129 which correlate to positions 125a to 129a. In effect, the like numbered positions are mated together. The positions of the master matrix are connected to the positions of the response matrix via lines 140 to 144 which correlate to lines 140a to 144a, respectively. A combined shorting and probe switch 145 is provided at the master matrix coupled to probe switch 145a via means indicated by dotted lines 146a. Switch 145 is adapted to short out all but one of the positions 132 to 136 and keep open the position with which it makes contact. Thus, with switch 145 contacting position 133, line 141 of position 133 is open while the rest are shorted as suggested by dotted lines 146, 147, 148 and 149. This corresponds to the normally closed switches 28 to 32 of FIG. 2. The shorted lines are connected at a common junction 150 to line 151, a battery or other source of power 152, line 153 to a circuit switch 154 which is coupled to switch 154a as shown. A line 130 extends from switch 154 through red lamp 155 and to student matrix switch 156 which is coupled to corresponding matrix switch 156a.

A similar circuit for the green lamp is provided starting with switch 145a connected to line 160, a battery or other suitable source of power 161, line 162, switch 154a, a summing motor 163 with associated control circuit 164, line 130a to green lamp 165 and to matrix switch 156a. Multiple connection points are provided in each of the lines as shown for connecting other response matrices in the master matrix.

Assuming the instructor has closed circuit switches 154, 154a and placed his probe switch to position 133 and related position 133a, while simultaneously shorting out positions 132, 134, 135 and 136, and the student in making the correct answer has placed probe switch 156, 156a into the corresponding position, it will be apparent that green lamp 165 will light since the circuit containing the red lamp is open. Had the student probed positions 127 and 127a, the red lamp would light while the green lamp would not, thus indicating an incorrect answer.

The master matrix may be completely prepared in advance as to all of the answers by using stepping relays to set up each answer. A timing circuit would be used where the time interval allotted each question is of uneven duration.

Another circuit embodiment is shown in FIG. 7 which performs a similar function as that shown in FIG. 6. The master matrix is shown comprising positions 170 to 174 coupled via wiring to positions 175 to 179 of the response matrix, with multiple connecting points provided for other response matrices. Probes or switches 180 (for master matrix) and 181 (for response matrix) are provided. Switch 180 is coupled via line 182 to battery 183 or other suitable source of power, and make up a circuit comprising meter 184 and associated control circuit 185, circuit switch 186, another circuit switch 187, line 188 which is connected to a relay 189 and line 190 which is in turn connected to probe 181. Another circuit which contains red and green lamps is provided having a source of power supply at 191, for example 110 volt A.C., and a step down transformer 192 adapted to yield a low voltage across its secondary coil of about 6.3 volts. Lines 193, 194 from the secondary coil form a circuit with a green lamp 195 and a red lamp 196 in parallel with each other as shown. Line 197 of the green lamp has two contact points 200–200a across which a circuit is completed via relay 189. Likewise, line 199 of the red lamp also has two contact points 198–198a across which a circuit is completed also via relay 189. Relay device 189 with its element 201 is biased in a position to complete the circuit of the red lamp across its contacts 198–198a. When a particular signal calls for a green light, relay element 201 opens the red lamp circuit and makes contact across contacts 200–200a of the green lamp circuit as shown by dotted lines. This will be apparent by referring to FIG. 7. The instructor closes circuit switches 186 and 187 and places his probe or switch 180 on position 171 as constituting the position to give the correct answer. The student in making the correct answer places his probe or switch on corresponding position 176 while at the same time perforating punched card 202 to record permanently his answer. The moment the student makes contact, the circuit is energized via batteries 183 and relay 189 is actuated to complete the circuit across contact points 200–200a of green lamp 195, while breaking the red lamp circuit across contacts 198–198a. Had the student placed his probe on positions 175, 177, 178 or 179, a circuit would not have been completed and the red lamp circuit would remain on.

Other circuits may be coupled to the relay device where it is desired to obtain other measurements. For example, additional contact points 203–203a may be provided to include a counter circuit or, for example, to direct a student to additional branching information, which might be in the nature of a tape recording or visual instructions on a closed circuit television camera. Or contact points 204–204a may be provided connected via line 204b to probe 180 and from contact point 204 to probe 190 to provide a relay holding circuit to allow the student's response to be stored in his machine instantly at the time he makes his response and removes his probe.

A still further and more simple circuit embodiment is depicted in FIG. 8. In this embodiment diodes are employed in conjunction with the signal means or lamps adapted to block or pass current through one of the lamps, depending upon which one is to be activated. Referring to the figure, the master matrix is shown comprising positions 205 to 209 coupled via wiring 205a to 209a to positions 210 to 214 of the response matrix. Probes or switches 215 (for the master matrix) and 216 (for the response matrix) are provided. Switch 215 is coupled to battery 217, or other suitable source of power, and make up a circuit comprising meter 218 and associated circuit 219, line 220, circuit switch 221 and line 222 which connects to branch lines 223 and 224 which are in parallel with each other. Branch line 223 contains a red lamp 225 and a diode 226 adapted to pass current in one direction only. In branch line 224, a green lamp 227 is provided having also associated with a diode connected in a direction reverse to that of diode 226. Both branch lines are connected to probe 216 as shown.

In the master matrix, probe or switch 215 is adapted when manipulated to short out all but one of the positions 205 to 209 and keep open the position with which it makes contact. Thus, with probe or switch 215 contacting position 207, line 207a of position 207 is open while the rest are automatically shorted out as suggested by dotted lines 229 to 232 through battery or other source of power 233 which is connected to line 220.

In conducting a test, the instructor closes switch 221 and places his probe or switch in position 207 as shown while simultaneously shorting out positions 229 to 232.

The student in making the correct answer places his probe or switch in position 212. It will be apparent from the circuit that the green light will light as current flows from battery 217 through line 220, closed switch 221, line 222, through line 224, green lamp 227, diode 228 and student's probe 216. Current is unable to flow through line 223 because of the reverse direction of diode 226. Had the student placed his probe in position 213 as shown by the dotted line representation of the probe, current from battery 233 flows through position 208, line 208a, position 213, diode 226 and through red lamp 225 but not through diode 228 which is in the reverse direction. The red lamp lights, denoting an incorrect answer.

As in the other embodiments, the master matrix may have a red and green lamp associated with its portion of the circuit, each lamp having a diode associated therewith in the manner shown for the portion of the circuit associated with the response matrix.

It is apparent from the foregoing that any combination of circuit means may be developed to couple the master and response matrices together without involving a complex wiring arrangement. A block diagram showing the relation between the teacher and a class, utilizing the system of the invention is depicted in FIG. 9 which shows student matrices and associated indicator circuits $S_1$, $S_2$, $S_3$ ... $S_n$ coupled to the master circuit, the results of the student testing circuits being fed to an overall indicator circuit coupled to the master circuit, the overall indicator circuit being either visual (e.g. lights), audio or involving a summing meter.

Figure 10:
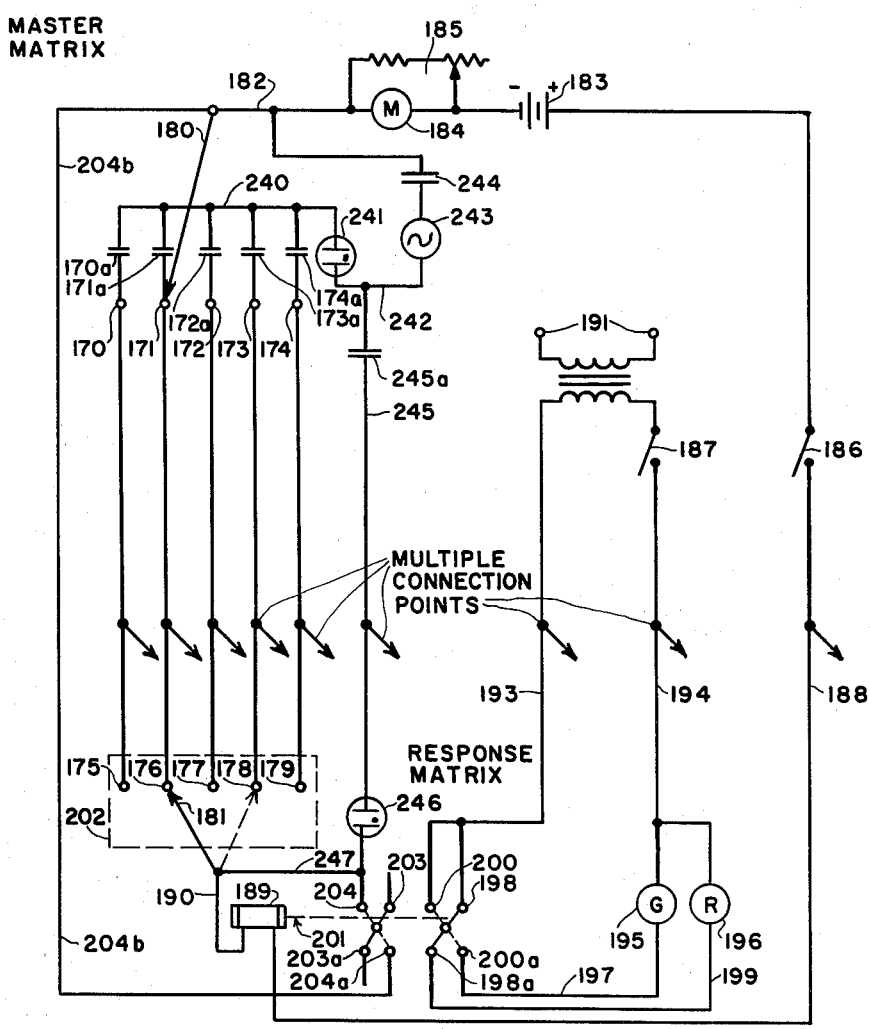

Sometimes during the operation of a circuit, a probe, unknown to a person operating the device, may not make sufficient contact to complete a circuit. For such a contingency, we provide, as a preferred embodiment, a subsidiary response circuit cooperably associated with the teaching device and adapted to indicate via a light whether the teaching circuit has been completed. One embodiment of such a subsidiary circuit is shown in FIG. 10 in cooperable association with the teaching device circuit depicted in FIG. 7.

As to those portions of the circuit which are a duplicate of the circuit of FIG. 7, the same numeral designations are employed and, therefore, need not be explained. The subsidiary circuit cooperably associated therewith comprises condensers 170a to 174a, each connected to corresponding positions 170 to 174 of the master matrix and to line 240. A master neon lamp 241 is connected in series with line 240 and in series via line 242 to a source of alternating current 243, for example a 55 volt alternating current supply, and through condenser 244 to line 182 of the teaching circuit between probe 180 and summing meter 184. Extending from line 242 is another line 245 which extends to the response matrix and has in series therewith a condenser 245a and a response neon lamp 246 which is connected via line 247 to response probe 181. Condenser 245a is an isolating condenser which protects the user from the possibility of shock.

The purpose of each neon light is to indicate whether a circuit is being made. The subsidiary circuit is so contrived that the master matrix will control the making of the circuit by the student at the response matrix. As stated hereinbefore, the teacher first closes switch 186 and places master probe 180 in one of the positions 170 to 174, the position chosen being 171. Immediately, neon light 241 lights up as will be apparent by tracing the circuit from probe 180 through position 171, then through condenser 171a, line 240, through neon light 241, source of alternating current 243, condenser 244, line 182 and back to probe 180.

Assuming the student has not placed his probe in position, his neon light will not go on as will be apparent from analyzing the circuit. However, when the student places probe 181 into position 176 which corresponds to position 171 of the master matrix, two things occur: first, the neon circuit is completed and neon light 246 lights up and tells the student that he has completed the circuit; and, second, relay 189 is activated via the completed teaching circuit through line 182, battery 183, switch 186, line 188 and back to relay 189. The relay is originally biased to complete a circuit across contacts 198–198a to activate red light 196. However, upon actuation of the relay, the red light circuit is broken and the green light circuit cut in via relay contact across contact points 200–200a as shown in dotted line. At this point, the teacher may close circuit switch 187 to indicate to the student as to whether the green light or red light has been activated.

Had the student placed his probe in position 178 as shown in dotted line, his neon light would be activated by a completed circuit through condenser 173a, line 240, through condenser 171a, thence through probe 180, line 182, condenser 244, source of alternating current 243, line 242 and through line 245 back to neon light 246. However, relay 189 would not be activated, and red light 196 would remain on indicating to the student that a wrong answer has been made, assuming circuit switch 187 has been closed by the teacher.

While the channels illustrated in FIGS. 1 and 2 are shown with the whole length of their surfaces electrically conductive, we may, as a preferred embodiment, coat each of the channels with a layer of insulation, leaving a small selected portion of the surface uncoated, so that contact would have to be made by the probe on the uncoated portion in order to obtain the correct answer. Thus, by having a plurality of coated strips with a selected portion of each left uncoated, a coded matrix could be derived in advance in which the correct answer positions are pre-arranged, leaving to the student to determine where the correct position is. An advantage of a coded matrix of this type enables the setting up of self contained testing devices, the details of which we intend to cover in a separate application.

In utilizing the invention, data storing examination cards are prepared in advance by pre-punching in code the student number, student name, card number, course number and section number. The cards are then distributed at examination time directly to each student. Each student then indexes his card on his matrix and the teacher at the master matrix monitors the examination by preparing has matrix and circuit for each question as it arises as described for FIG. 2. A given time is allowed for each question, and upon completion of the examination, the tabulation cards perforated by the students are handed in to the teacher. One or more cards may be involved in an examination.

After the examination is given, a key card is prepared by the teacher almost similar to that of the examination card. This card may be scanned by a data card processing machine before the students' examination cards are scanned, and all answers are compared to it.

The equipment which may be used in preparing and processing data storing cards may comprise a keypunch machine of the IBM 026 or 024 type for producing pre-punched examination cards; an interpreter for card printing such as the IBM 548; a reproducer, e.g. IBM 519, which places holes in the cards according to the marks achieved, the cards being thereafter sorted to arrange them by section, card number, student number, etc.; a computer of the IBM 1620 type for processing all examinations and produce, in one pass, a single deck of cards to list the final report; and a tabulator of the IBM 407 type for listing the final report.

As illustrative of the type of information which can be obtained using the data card processing methods, reference is made to Table I which is an examination analysis by section and to Table II which is an examination analysis by student number.

Table I

| | | Question Number | A | B | C | D | E | Omissions | Percent Correct |
|---|---|---|---|---|---|---|---|---|---|
| | | EXAM ANALYSIS BY SECTION | | | | | | | |
| 2 | 511 | 1 | 1 | 4 | 9* | 7 | | | 43 |
| 2 | 511 | 2 | 3 | 18* | | | | | 86 |
| 2 | 511 | 3 | 2 | 7* | 12 | | | | 33 |
| 2 | 511 | 4 | | 2 | 19* | | | | 90 |
| 3 | 511 | 5 | | | | 21* | | | 100 |
| 2 | 511 | 6 | 18* | 1 | | 2 | | | 86 |
| 2 | 511 | 7 | | 1 | | 20* | | | 95 |
| 2 | 511 | 8 | | 10* | | 11 | | | 48 |
| 2 | 511 | 9 | | 17* | 4 | | | | 81 |
| 2 | 511 | 10 | | 1 | | 20* | | | 95 |
| 2 | 511 | 11 | | | 21* | | | | 100 |
| 2 | 511 | 12 | 3* | 6 | | 12 | | | 14 |
| 2 | 511 | 13 | 1 | | 3 | 17* | | | 81 |
| 2 | 511 | 14 | This question not graded by request of the instructor | | | | | | |
| 2 | 511 | 15 | 20* | | | 1 | | | 95 |
| 2 | 511 | 16 | 3 | 4 | 14* | | | | 67 |
| 2 | 511 | 17 | | 15 | 6* | | | | 29 |
| 2 | 511 | 18 | 2 | 18* | | | | 1 | 86 |
| 2 | 511 | 19 | 9 | 12* | | | | | 57 |
| 2 | 511 | 20 | | | 7 | 14* | | | 67 |
| 2 | 511 | 21 | 2 | | 18* | 1 | | | 86 |
| 2 | 511 | 22 | | | | 6 | 15* | | 71 |
| 2 | 511 | 23 | 3 | 3 | 10* | 5 | | | 48 |
| 2 | 511 | 34 | 6 | 7* | 1 | 7 | | | 33 |
| 2 | 511 | 25 | 3 | 8 | 7* | 3 | | | 33 |

Asterisk (*) indicates the correct answer.

Table II

| | | Name | Student Number | Number Right | Number Wrong | Number Omitted | Score |
|---|---|---|---|---|---|---|---|
| 1 | 511 | | 01370 | 20 | 4 | | 83 |
| 1 | 511 | | 01810 | 15 | 9 | | 63 |
| 1 | 511 | | 04190 | 17 | 7 | | 71 |
| 1 | 511 | | 04620 | 15 | 9 | | 63 |
| 1 | 511 | | 07830 | 19 | 5 | | 79 |
| 1 | 511 | | 10890 | 18 | 6 | | 75 |
| 1 | 511 | | 12130 | 18 | 6 | | 75 |
| 1 | 511 | | 12863 | 14 | 10 | | 58 |
| 1 | 511 | | 13820 | 18 | 6 | | 75 |
| 1 | 511 | | 14800 | 17 | 7 | | 71 |
| 1 | 511 | | 14820 | 22 | 2 | | 92 |
| 1 | 511 | | 16420 | 11 | 13 | | 46 |
| 1 | 511 | | 17580 | 18 | 6 | | 75 |
| 1 | 511 | | 20540 | 18 | 6 | | 75 |
| 1 | 511 | | 21700 | 15 | 9 | | 63 |
| 1 | 511 | | 22900 | 13 | 11 | | 54 |
| 1 | 511 | | 25950 | 16 | 8 | | 67 |
| 1 | 511 | | 26040 | 17 | 7 | | 71 |
| 1 | 511 | | 26540 | 18 | 6 | | 75 |
| 1 | 511 | | 26720 | 16 | 8 | | 67 |
| 1 | 511 | | 27170 | 16 | 8 | | 67 |
| 1 | 511 | | 32300 | 18 | 6 | | 75 |
| 1 | 511 | | 37170 | 13 | 11 | | 54 |
| 1 | 511 | | 37450 | 16 | 8 | | 67 |
| 1 | 511 | | 37590 | 20 | 4 | | 83 |
| 1 | 511 | | 38180 | 16 | 8 | | 67 |
| 1 | 511 | | 38580 | 23 | 1 | | 96 |
| 1 | 511 | | 39580 | 13 | 11 | | 54 |
| 1 | 511 | | 41390 | 13 | 11 | | 54 |
| 1 | 511 | | 43860 | 17 | 7 | | 71 |

While the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a teaching system adapted for class response, a testing device comprising circuit means for indicating a response to a stimulant, a master matrix coupled to said circuit means comprising a plurality of pairs of contact elements, circuit actuating means selectively operable by a teacher for cooperating with at least one pair of said contact elements to prepare a preferred circuit for completion through said circuit means, a student response matrix remotely situated from said master matrix coupled to said circuit means and master matrix and controllable by a student to indicate his response to said stimulant, said response matrix comprising a network of response units formed of pairs of electrically conductive elements coupled to said plurality of pairs of contact elements of said master matrix, a data gathering card element indexable with the electrically conductive elements of the response matrix, and probe means selectively operable by a student for applying a response to a selected area of the card element when indexed with the response matrix and for simultaneously energizing the circuit via electrical contact with a selected response unit correlated to said selected area of the card, whereby the circuit means for indicating a response to said stimulant is completed when a student makes his response via his probe means, a desired response being indicated when the student completes the preferred circuit prepared by the teacher as compared to an undesired response when the prepared circuit is not completed.

2. The teaching system as in claim 1 wherein the master matrix has a master data gathering card element indexable therewith for recording for data gathering purposes a preferred response selected by the teacher, and signal means electrically coupled to said circuit means for indicating the result of said response, whereby a student obtains immediate reinforcement of his answer via said signal means while at the same time stores the result of said response on said card for comparison with the master card for data processing purposes.

3. The teaching system as in claim 2 wherein a plurality of response matrices are remotely situated from the master matrix and multipled to the circuit means coupled to the master matrix, and wherein a summing means is provided coupled to said circuit means for providing the teacher with an immediate measure of class accomplishment.

4. The teaching system as in claim 2 wherein the data gathering card element employed with the student matrix and with the master matrix is a punch card having a plurality of pre-arranged perforatable areas indexable with the conductive elements of each matrix.

5. The teaching system as in claim 2 wherein a circuit indicating means is associated with the master matrix for indicating when the master matrix has been prepared and wherein a circuit indicating means is associated with the response matrix for indicating when each response matrix has been prepared.

6. A teaching system as in claim 2 wherein the signal means electrically coupled to said circuit means comprises two means each in parallel with the other, one means indicating a correct response and having in series therewith a diode for passing current in only one direction, the other means indicating an incorrect response and having a diode in series therewith for passing a current in only the opposite direction.

7. The teaching system as in claim 1 including means in said circuit electrically responsive to a wrong response by a student for feeding branching information to said student.

References Cited by the Examiner
UNITED STATES PATENTS

| | | | |
|---|---|---|---|
| 2,562,179 | 7/51 | Dorf | 35—48 |
| 2,654,163 | 10/53 | Reynolds | 35—9 |
| 2,943,400 | 7/60 | Griswold | 35—9 |
| 3,057,082 | 10/62 | Wellington et al. | 35—9 |
| 3,077,038 | 2/63 | Williams et al. | 35—9 |
| 3,095,653 | 7/63 | Corrigan | 35—9 |
| 3,100,352 | 8/63 | Boissevain | 35—9 |

JEROME SCHNALL, *Primary Examiner.*